US012717251B2

(12) United States Patent
Sakakibara et al.

(10) Patent No.: US 12,717,251 B2
(45) Date of Patent: Aug. 25, 2026

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Akira Sakakibara, Shizuoka (JP); Yuka Ishiduka, Shizuoka (JP); Daisuke Miura, Tokyo (JP); Tsutomu Nishida, Shizuoka (JP); Fumiyuki Hiyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 485 days.

(21) Appl. No.: 18/509,703

(22) Filed: Nov. 15, 2023

(65) Prior Publication Data

US 2024/0201608 A1 Jun. 20, 2024

(30) Foreign Application Priority Data

Nov. 25, 2022 (JP) ................................ 2022-188610
Nov. 10, 2023 (JP) ................................ 2023-192367

(51) Int. Cl.

*G03G 5/147* (2006.01)
*G03G 5/05* (2006.01)
*G03G 15/00* (2006.01)

(52) U.S. Cl.

CPC ......... *G03G 5/0578* (2013.01); *G03G 5/0564* (2013.01); *G03G 15/75* (2013.01)

(58) Field of Classification Search

CPC .......... G03G 5/14756; G03G 5/14739; G03G 5/14773

See application file for complete search history.

(56) References Cited

U.S. PATENT DOCUMENTS

| | | | |
|---|---|---|---|
| 7,704,657 | B2 | 4/2010 | Uesugi |
| 7,799,496 | B2 | 9/2010 | Uesugi |
| 7,910,274 | B2 | 3/2011 | Tanaka |
| 8,088,541 | B2 | 1/2012 | Tanaka |
| 8,481,236 | B2 | 7/2013 | Tanaka |
| 8,632,935 | B2 | 1/2014 | Sugiyama |
| 8,765,335 | B2 | 7/2014 | Tanaka |
| 8,865,381 | B2 | 10/2014 | Tanaka |
| 9,029,054 | B2 | 5/2015 | Okuda |
| 9,063,505 | B2 | 6/2015 | Sekiya |

(Continued)

FOREIGN PATENT DOCUMENTS

JP 2007-128106 A 5/2007

OTHER PUBLICATIONS

U.S. Appl. No. 18/463,501, Kunihiko Sekido, filed Sep. 8, 2023.

(Continued)

*Primary Examiner* — Peter L Vajda
(74) *Attorney, Agent, or Firm* — VENABLE LLP

(57) ABSTRACT

An electrophotographic photosensitive member includes a surface layer. The surface layer comprises a polycarbonate resin (α) and a polycarbonate resin (β). The polycarbonate resin (α) has a structural unit represented by a following formula (A) described herein and a structural unit represented by a following formula (B) described herein. The polycarbonate resin (β) has a structure having a dimethylsiloxane moiety.

10 Claims, 1 Drawing Sheet

(56) References Cited

U.S. PATENT DOCUMENTS

| | | | |
|---|---|---|---|
| 9,069,267 | B2 | 6/2015 | Kaku |
| 9,114,565 | B2 | 8/2015 | Kawai |
| 9,170,506 | B2 | 10/2015 | Tanaka |
| 9,170,507 | B2 | 10/2015 | Sugiyama |
| 9,274,442 | B2 | 3/2016 | Sato |
| 9,304,414 | B2 | 4/2016 | Miura |
| 9,304,416 | B2 | 4/2016 | Noguchi |
| 9,436,106 | B2 | 9/2016 | Kuno |
| 9,459,545 | B2 | 10/2016 | Tanaka |
| 9,541,850 | B2 | 1/2017 | Nishida |
| 9,563,139 | B2 | 2/2017 | Kawahara |
| 9,599,917 | B2 | 3/2017 | Okuda |
| 9,645,515 | B2 | 5/2017 | Kuno |
| 9,645,516 | B2 | 5/2017 | Kawahara |
| 9,684,277 | B2 | 6/2017 | Yamamoto |
| 9,726,992 | B2 | 8/2017 | Sakuma |
| 9,772,596 | B2 | 9/2017 | Mitsui |
| 9,851,646 | B2 | 12/2017 | Tomono |
| 9,869,032 | B2 | 1/2018 | Kawahara |
| 10,416,581 | B2 | 9/2019 | Ito |
| 10,452,021 | B2 | 10/2019 | Miura |
| 10,539,892 | B2 | 1/2020 | Nishida |
| 10,545,453 | B2 | 1/2020 | Iwasaki |
| 10,558,132 | B2 | 2/2020 | Ishiduka |
| 10,558,133 | B2 | 2/2020 | Nakamura |
| 10,642,177 | B2 | 5/2020 | Nakamura |
| 10,663,913 | B2 | 5/2020 | Yamaal |
| 10,691,033 | B2 | 6/2020 | Nishida |
| 10,747,130 | B2 | 8/2020 | Okuda |
| 10,747,131 | B2 | 8/2020 | Watanabe |
| 10,831,117 | B2 | 11/2020 | Sakakibara |
| 10,831,118 | B2 | 11/2020 | Watanabe |
| 10,838,315 | B2 | 11/2020 | Shimozawa |
| 10,942,462 | B2 | 3/2021 | Ito |
| 11,003,102 | B2 | 5/2021 | Ishiduka |
| 11,112,719 | B2 | 9/2021 | Makisumi |
| 11,137,716 | B2 | 10/2021 | Hiyama |
| 11,150,566 | B2 | 10/2021 | Iwasaki |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 11,392,074 | B2 | 7/2022 | Ishida |
| 11,782,353 | B2 | 10/2023 | Nakamura |
| 2014/0255838 | A1* | 9/2014 | Matsuda ............ G03G 5/14756 399/176 |
| 2021/0325794 | A1 | 10/2021 | Iwasaki |
| 2023/0288826 | A1 | 9/2023 | Nakazono |
| 2023/0288867 | A1 | 9/2023 | Shimozawa |
| 2023/0333494 | A1 | 10/2023 | Watariguchi |
| 2024/0004322 | A1 | 1/2024 | Makisumi |

OTHER PUBLICATIONS

U.S. Appl. No. 18/489,936, Tatsuya Yamaai, filed Oct. 19, 2023.
U.S. Appl. No. 18/505,369, Yuka Ishiduka, filed Nov. 9, 2023.
U.S. Appl. No. 18/511,264, Fumiyuki Hiyama, filed Nov. 16, 2023.

* cited by examiner

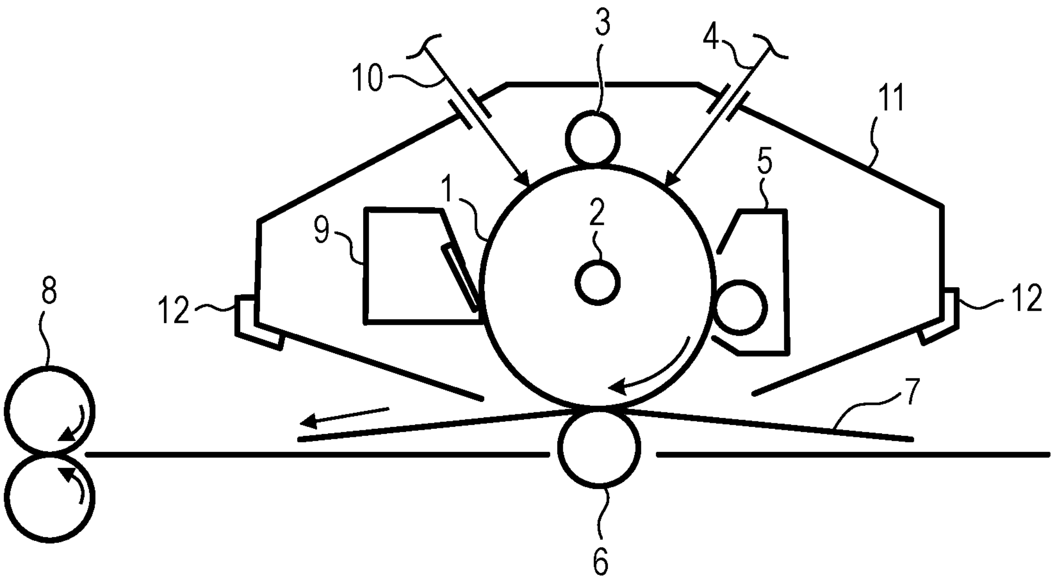
3
4
10
11
1
2
5
9
8
12
12
7
6

ELECTROPHOTOGRAPHIC PHOTOSENSITIVE MEMBER, PROCESS CARTRIDGE AND ELECTROPHOTOGRAPHIC APPARATUS

BACKGROUND OF THE DISCLOSURE

Field of the Disclosure

The present disclosure relates to an electrophotographic photosensitive member, and a process cartridge and an electrophotographic apparatus having the electrophotographic photosensitive member.

Description of the Related Art

An electrophotographic photosensitive member used in an electrophotographic apparatus is sometimes transported at a temperature of 0° C. or below during transportation from a production facility to a region where the electrophotographic photosensitive member is to be used. If the electrophotographic photosensitive member is subjected to shocks during transportation at a low temperature, the electrophotographic photosensitive member has a risk of cracks forming in a surface layer (hereafter referred to as "crack"). In contrast, siloxane resins have high fluidity and are known to retain their fluidity even at temperatures below 0° C., and so by introducing a siloxane resin into the surface layer of the electrophotographic photosensitive member, an effect of suppressing the occurrence of a crack of the surface layer can be expected.

However, polycarbonate resin, which is generally used as a material for the surface layer of electrophotographic photosensitive members, has a high stacking property, and so introducing a siloxane resin into the surface layer effectively is difficult. Therefore, that has still room for improvement in order to suppress the occurrence of a crack of the surface layer that occurs during transportation at a low temperature (Japanese Patent Application Laid-Open No. 2007-128106).

According to studies by the inventors of the present application, the electrophotographic photosensitive member described in the examples of Japanese Patent Application Laid-Open No. 2007-128106 has improved abrasion resistance of a polycarbonate resin, and is capable of extending the life of the member, but because polycarbonate resin has a high stacking property, and introducing a siloxane resin into the surface layer effectively is difficult, the inventors found a problem in that a crack occurs on the surface layer by being subjected to shocks during transportation at a low temperature.

Accordingly, an object of the present disclosure is to provide an electrophotographic photosensitive member which is capable of suppressing the occurrence of a crack in the surface layer of the electrophotographic photosensitive member during transportation at a low temperature and which is capable of obtaining a good image.

SUMMARY OF THE DISCLOSURE

The above object is achieved by the present disclosure, as described below.

That is, an electrophotographic photosensitive member according to the present disclosure includes a surface layer, wherein the surface layer comprises a polycarbonate resin (α) and a polycarbonate resin (β), wherein the polycarbonate resin (α) has a structural unit represented by a following formula (A) and a structural unit represented by a following formula (B), and wherein the polycarbonate resin (β) has a structure having a dimethylsiloxane moiety.

(A)

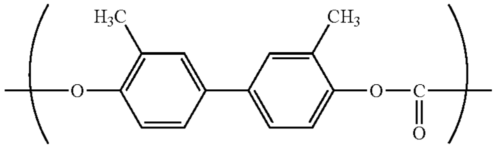

(B)

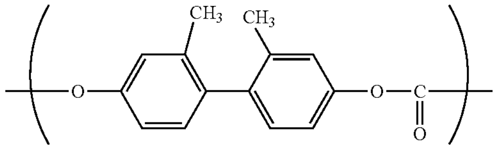

Further features of the present disclosure will become apparent from the following description of exemplary embodiments with reference to the attached drawing.

BRIEF DESCRIPTION OF THE DRAWINGS

FIGURE is a diagram illustrating an example of a schematic configuration of an electrophotographic apparatus having a process cartridge provided with the electrophotographic photosensitive member of the present disclosure.

DESCRIPTION OF THE EMBODIMENTS

Preferred embodiments of the present disclosure will now be described in detail in accordance with the accompanying drawing.

Hereinafter, the present disclosure will be described in detail with reference to exemplary embodiments.

As a result of studies conducted by the inventors, the inventors found a problem that when the electrophotographic photosensitive member described in Japanese Patent Application Laid-Open No. 2007-128106 is stored in a low-temperature environment of 0° C. or less while still being attached to an electrophotographic cartridge, a crack tends to occur in the surface layer when subjected to a shock. To solve this problem, the inventors tried to see whether the occurrence of a crack could be suppressed by introducing a siloxane resin or not, which is known to retain fluidity even at 0° C. or less, into the surface layer of the electrophotographic photosensitive member. However, as a result of the studies by the inventors, although a small amount of siloxane resin could be introduced into the surface layer, the effect of suppressing an occurrence of a crack was not sufficient, and introducing a large amount of the siloxane resin was difficult. The inventors assume that this is because the polycarbonate resin has a high stacking property, making it difficult for other resins to dissolve.

Therefore, the inventors conducted a study to effectively introduce a siloxane resin into the surface layer by lowering the stacking property of the polycarbonate resin within a range that does not impair the abrasion resistance of the polycarbonate resin. As a result, the inventors found that the occurrence of a crack in a surface layer of an electrophotographic photosensitive member in a low-temperature transportation environment can be suppressed when the surface layer contains a polycarbonate resin (α) and a polycarbonate resin (β), in which the polycarbonate resin (α) has a structural unit represented by the following formula (A) and a structural unit represented by the following formula (B), and the polycarbonate resin (β) has a structure having a dimethylsiloxane moiety.

(A)

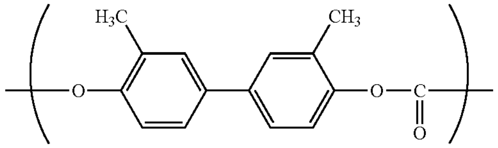

(B)

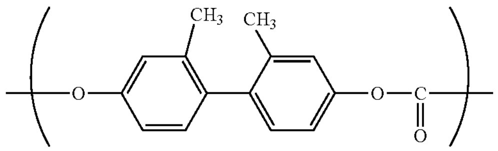

The inventors suppose that in a conventional polycarbonate resin, which only has the structure of the above formula (A), the stacking property is high, whereas by including an appropriate amount of the structure of the above formula (B), in which the arrangement of the methyl groups is different, the stacking property of the polycarbonate resin is appropriately lowered, and gaps are formed between molecules. The inventors suppose that the siloxane resin can enter the gaps more easily than in a conventional polycarbonate resin, and the inventors assume that as a result, fluidity of a resin is secured by an effect of the siloxane resin, so that the resin becomes more flexible and has better crack resistance.

Due to the effects described above, according to the present disclosure, an occurrence of a crack in a surface layer of an electrophotographic photosensitive member during transportation at a low temperature can be suppressed.

Electrophotographic Photosensitive Member

The electrophotographic photosensitive member of the present disclosure is characterized by having a surface layer, and specifically, preferably has an undercoat layer, a charge generation layer, and a surface layer on a support.

Examples of a method for producing the electrophotographic photosensitive member of the present disclosure include a method for preparing a coating liquid for each layer, which will be described later, applying the coating liquid in the order of desired layers, followed by drying. Examples of the method of applying the coating liquid include dip coating, spray coating, ink jet coating, roll coating, die coating, blade coating, curtain coating, wire bar coating and ring coating. Among these methods, dip coating is preferable from a viewpoint of efficiency and productivity.

The support and each layer will be described below.

Support

In the present disclosure, the electrophotographic photosensitive member has a support. In the present disclosure, the support is preferably an electroconductive support having electroconductivity. In addition, examples of the shape of the support include a cylindrical shape, a belt shape, and a sheet shape. Among such supports, a cylindrical support is preferable. In addition, a surface of the support may be subjected to electrochemical treatment such as anodization, a blast treatment, or a cutting treatment.

A material of the support is preferably a metal, a resin or glass.

Examples of the metal include aluminum, iron, nickel, copper, gold, stainless steel and alloys thereof. Among such metals, an aluminum support using aluminum is preferable.

In addition, the electroconductivity may be imparted to the resin or the glass by a treatment such as mixing of or coating with an electroconductive material.

Undercoat Layer

In the present disclosure, an undercoat layer may be provided on the support. Providing an undercoat layer can enhance an adhesion function between layers and impart a function of inhibiting charge injection. The electrophotographic photosensitive member of the present disclosure preferably contains a polyamide resin and a titanium oxide particle.

The undercoat layer preferably contains a resin. Further, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin and a cellulose resin.

Examples of the polymerizable functional group in the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group and a carbon-carbon double bond group.

In addition, for the purpose of enhancing the electrical characteristics, the undercoat layer may further contain an electron transporting substance, a metal oxide, a metal and an electroconductive polymer. Among these, an electron transporting substance and a metal oxide are preferably used.

Examples of the electron transport material include a quinone compound, an imide compound, a benzimidazole compound, a cyclopentadienylidene compound, a fluorenone compound, a xanthone compound, a benzophenone compound, a cyano vinyl compound, a halogenated aryl compound, a silole compound and a boron-containing compound. The undercoat layer may be formed as a cured film by using an electron transporting substance having a polymerizable functional group and copolymerizing the electron transporting substance with a monomer having the above polymerizable functional group.

Examples of the metal oxide include indium tin oxide, tin oxide, indium oxide, titanium oxide, zinc oxide, aluminum oxide and silicon dioxide. Examples of the metal include gold, silver, and aluminum. A titanium oxide particle is preferably used.

In addition, the undercoat layer may further contain additives such as an antioxidant and an ultraviolet absorber. Specific examples of the additives include a hindered phenol compound, a hindered amine compound, a sulfur compound, a phosphorus compound, and a benzophenone compound.

The average film thickness of the undercoat layer is preferably 0.1 μm or more and 50 μm or less, more preferably 0.2 μm or more and 40 μm or less, and particularly preferably 0.3 μm or more and 30 μm or less.

The undercoat layer can be formed by preparing a coating liquid for the undercoat layer which contains each of the above materials and a solvent, forming a coating film of the coating liquid on the support, and drying and/or curing the coating film. Examples of the solvent used for the coating liquid include an alcohol-based solvent, a ketone-based solvent, an ether-based solvent, an ester-based solvent and an aromatic hydrocarbon-based solvent.

Charge Generating Layer

The electrophotographic photosensitive member preferably further has a charge generating layer above the support and the undercoat layer.

The charge generating layer preferably contains a charge generating substance and a resin.

Examples of the charge generating substances include an azo pigment, a perylene pigment, a polycyclic quinone pigment, an indigo pigment and a phthalocyanine pigment. Among these pigments, an azo pigment and a phthalocyanine pigment are preferable. Among the phthalocyanine pigments, an oxytitanium phthalocyanine pigment, a chlorogallium phthalocyanine pigment and a hydroxygallium phthalocyanine pigment are preferable. In particular, the charge generating layer preferably contains oxytitanium phthalocyanine pigment having a peak at 27.2°+0.2° of a Bragg angle 2θ in a CuKα characteristic X-ray diffraction spectrum.

The content of the charge generating substance in the charge generating layer is, with respect to a total mass of the charge generation layer, preferably 40% by mass or more and 85% by mass or less with respect to a total mass of the charge generation layer and more preferably 60% by mass or more and 80% by mass or less with respect to a total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. Among these resins, a polyvinyl butyral resin is more preferable.

In addition, the charge generating layer may further contain additives such as an antioxidant and an ultraviolet absorber. Specific examples of the additives include a hindered phenol compound, a hindered amine compound, a sulfur compound, a phosphorus compound, and a benzophenone compound.

The average film thickness of the charge generating layer is preferably 0.1 μm or more and 1 μm or less, and more preferably 0.15 μm or more and 0.4 μm or less.

The charge generating layer can be formed by preparing a coating liquid for the charge generating layer which contains each of the above materials and a solvent, forming a coating film of the coating liquid on the undercoat layer, and drying the coating film. Examples of the solvents used for the coating liquid include an alcohol-based solvent, a sulfoxide-based solvent, a ketone-based solvent, an ether-based solvent, an ester-based solvent, and an aromatic hydrocarbon-based solvent.

Surface Layer

The electrophotographic photosensitive member of the present disclosure has a surface layer on the charge generating layer. The surface layer is characterized by having a polycarbonate resin (α) and a polycarbonate resin (β). The surface layer preferably further contains a charge transporting substance.

The polycarbonate resin (α) has a structural unit represented by the following formula (A) and a structural unit represented by the following formula (B). Further, the polycarbonate resin (α) may contain either one or a plurality of a structural unit represented by the following general formula (C) as long as the effects of the present disclosure are not impaired. Among such structure units, having a structural unit represented by formula (C-1) is particularly preferable because crack resistance of the surface layer can be improved without impairing the solubility as a resin.

(A)

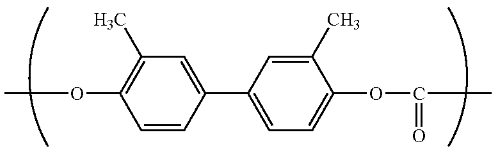

(B)

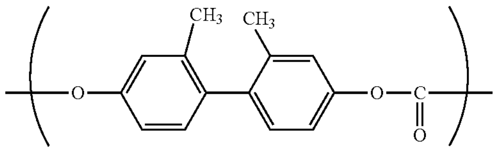

(C)

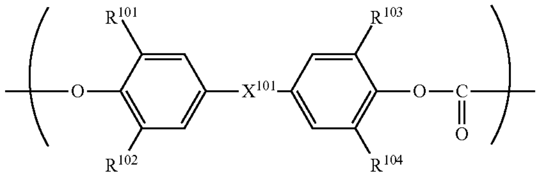

In formula (C), $X^{101}$ represents a single bond or a divalent group, and $R^{101}$ to $R^{104}$ each independently represents a hydrogen atom, an alkyl group, or an aryl group.

Specific examples (C-1) to (C-13) of the structure represented by the formula (C) are illustrated below.

(C-1)

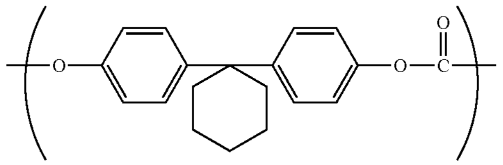

(C-2)

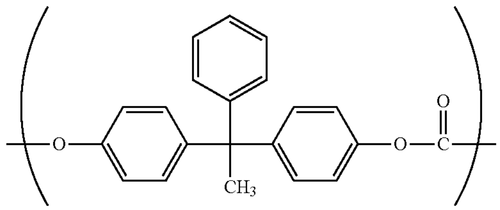

(C-3)

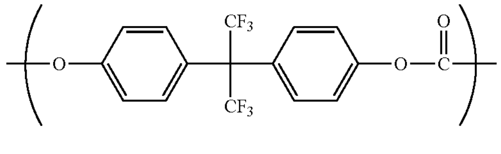

-continued (C-4)

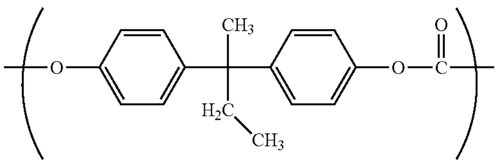

(C-5)

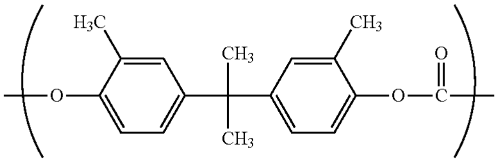

(C-6)

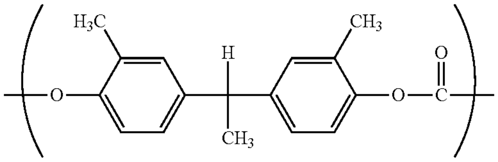

(C-7)

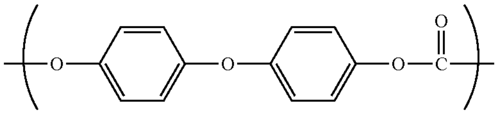

(C-8)

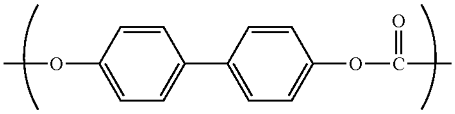

(C-9)

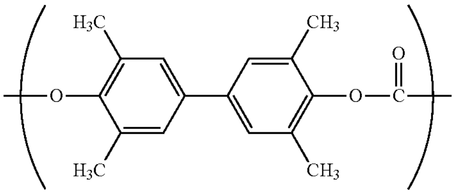

(C-10)

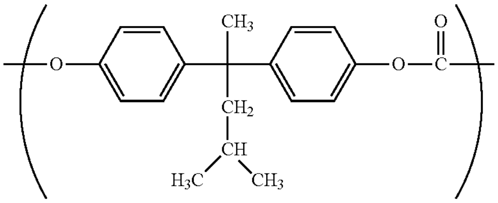

(C-11)

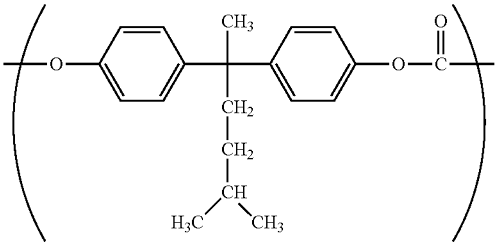

-continued (C-12)

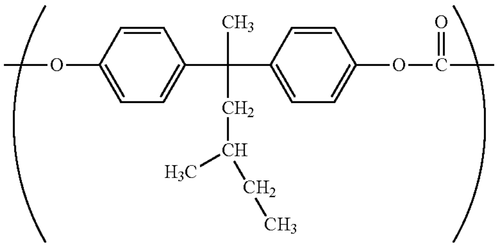

(C-13)

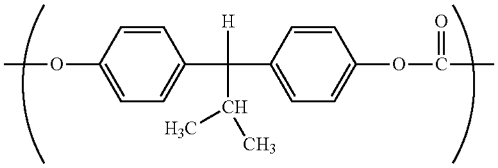

In the present disclosure, the copolymerization form of the polycarbonate resin (α) may be any form, such as block copolymerization, random copolymerization, or alternating copolymerization. The structural units of the polycarbonate resin (α) can be analyzed using a known analysis apparatus, such as NMR, GPC, MALDI, etc.

The polycarbonate resin (β) of the present disclosure is characterized by having a structure having a dimethylsiloxane moiety. The polycarbonate resin (β) has a structure represented by the following formula (PC-β).

(PC-β)

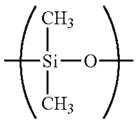

A specific example of the structure represented by formula (PC-β) is shown below. In particular, in the studies conducted by the inventors, having a structure represented by the following formula (D) or (E), which was more effective in suppressing an occurrence of a crack in the surface layer, is preferable.

(D)

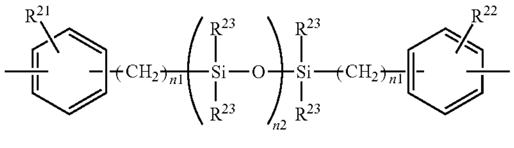

In formula (D), $R^{21}$ and $R^{22}$ are each independently a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms, $R^{23}$ is a methyl group, n1 is an integer of 2 to 4 and n2 is an integer of 1 to 600.

(E)

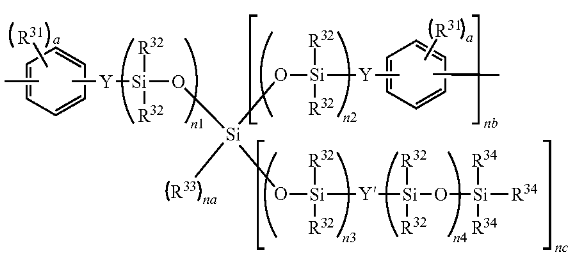

In formula (E), $R^{31}$ represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms, $R^{32}$ is a methyl group, $R^{33}$ are each independently a same or different monovalent hydrocarbon group which is free of aliphatic unsaturated bond, $R^{34}$ are each independently a same or different monovalent hydrocarbon group free of aliphatic unsaturated bond, Y and Y' each represents an alkylene group having 2 or more carbon atoms, an alkyleneoxyalkylene group or an oxygen atom, na is 0 or 1, nb is 1 or 2 and nc is 1 or 2, provided that the sum of na, nb and nc is 3 and that n1 to n4 are each an integer of 0 or more and that the sum of n1, n2, n3 and n4 is an integer of 2 to 600 and that the sum of n3 and n4 is an integer of 1 or more and that a is an integer of 0 to 4. The chemical structure of the present disclosure can be analyzed by nuclear magnetic resonance (NMR) apparatus.

Specific examples of formulas (D) and (E) include the following.

(D-1)

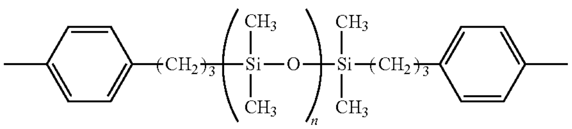

(D-2)

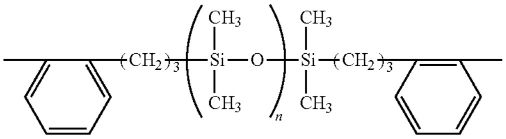

(D-3)

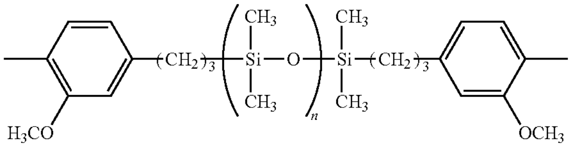

(D-4)

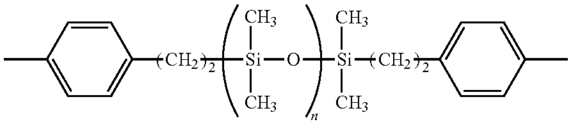

-continued (D-5)

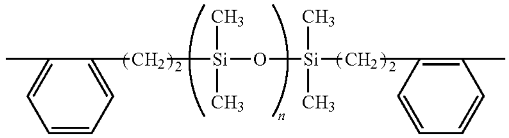

(E-1)

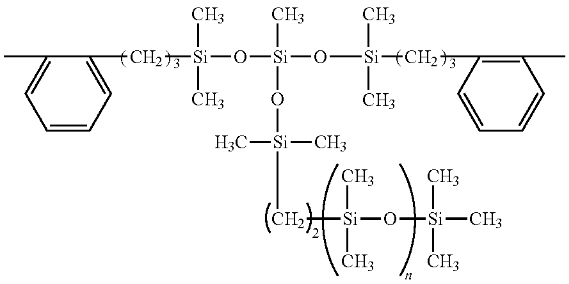

In the above formulas (D-1) to (D-5) and (E-1), n, which is the number of repeating units of the dimethylsiloxylene group, is preferably 1 or more and 600 or less, more preferably 10 or more and 300 or less, particularly preferably 20 or more and 200 or less and most preferably 30 or more and 150 or less.

By setting n, which is a number of repeating units of the dimethylsiloxylene group, to 600 or less, compatibility with the polycarbonate resin (α) becomes good, and the reaction can be completed in the polymerization step. Therefore, after polymerization, unreacted organosiloxane-modified phenol compounds can be prevented from remaining in a final polycarbonate copolymer, and thus when used as the resin of an electrophotographic photosensitive member, an increase in residual potential on the surface of the electrophotographic photosensitive member can be suppressed without the resin becoming cloudy.

On the other hand, by setting n, which is a number of repeating units of the dimethylsiloxylene group, to 1 or more, sufficient surface energy properties can be imparted to the electrophotographic photosensitive member, and furthermore, adhesion of foreign substances can be effectively prevented.

From a viewpoint that the polycarbonate resin (β) can be appropriately introduced into the surface layer while appropriately lowering the stacking property of the polycarbonate resin (α) described above, the total amount of the structural unit represented by the formula (A) and the structural unit represented by the formula (B) in the polycarbonate resin (α) of the present disclosure is more preferably 40 mol % or more and 60 mol % or less with respect to a total amount of the structural unit represented by the formula (A), the structural unit represented by the formula (B) and the structural unit represented by the formula (C), and an amount of the structural unit represented by the formula (C) in the polycarbonate resin (α) is more preferably 40 mol % or more and 60 mol % or less with respect to a total amount of the structural unit represented by the formula (A), the structural unit represented by the formula (B) and the structural unit represented by the formula (C). The numerical values can be determined by structural analysis by NMR and quantitative analysis by gas chromatography-mass spectrometry (GC/MS).

Further, the content of the structure having the dimethylsiloxane moiety in the polycarbonate resin (β) is preferably 3% by mass or more and 20% by mass or less with respect to the total mass of the polycarbonate resin (β) and the content of the polycarbonate resin (β) in the surface layer is preferably 5% by mass or more and 15% by mass or less with respect to the polycarbonate resin (α). Such numerical values can be determined by structural analysis by NMR and quantitative analysis by gas chromatography mass spectrometry (GC/MS).

In addition to the polycarbonate resin described above, other resins may be used as a binder resin in the surface layer as long as the effects of the present disclosure are not impaired. Specific examples include a polyester resin, a siloxane resin, a polymethacrylate resin, a polysulfone resin and a polystyrene resin. A plurality of types of other resins may be blended or copolymerized.

In addition, the surface layer may contain additives such as an antioxidant, an ultraviolet absorber, a plasticizer, a leveling agent, a slipperiness imparting agent and an abrasion resistance improver. Specific examples include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle and a boron nitride particle.

An average film thickness of the surface layer is preferably 5 μm or more and 50 μm or less, more preferably 8 μm or more and 40 μm or less, and particularly preferably 10 μm or more and 30 μm or less. The average film thickness of the surface layer can be determined, for example, by scanning electron microscope (SEM) observation of a cross section.

The surface layer can be formed by preparing a coating liquid for the surface layer which contains each of the above materials and a solvent, forming a coating film of the coating liquid on the charge generating layer, and drying the coating film. Examples of the solvent used for the coating liquid for forming the surface layer include an alcohol-based solvent, a sulfoxide-based solvent, a ketone-based solvent, an ether-based solvent, an ester-based solvent, and an aromatic hydrocarbon-based solvent.

The surface layer preferably includes a charge transporting substance. Examples of the charge transporting substance include a polycyclic aromatic compound, a heterocyclic compound, a hydrazone compound, a styryl compound, an enamine compound, a benzidine compound, a triarylamine compound and a resin having a group derived from these substances. Among these charge transporting substances, a triarylamine compound and a benzidine compound are preferable. In addition, a plurality of types of charge transporting substance may be contained together. Specific examples (CTM-1) to (CTM-19) of the charge transporting substance are shown below.

(CTM-1)

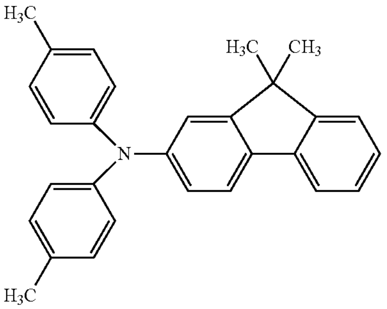

(CTM-2)

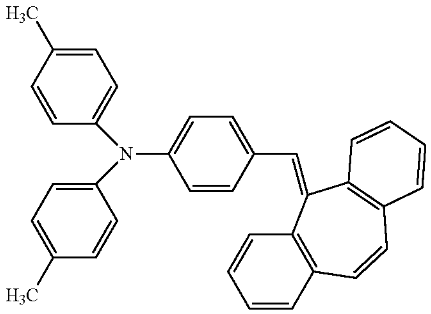

(CTM-3)

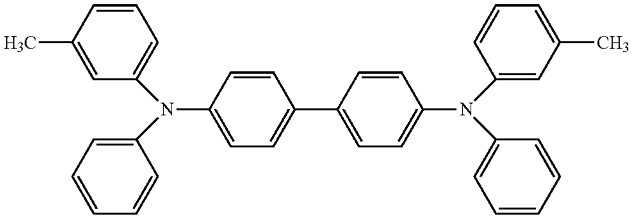

(CTM-4)

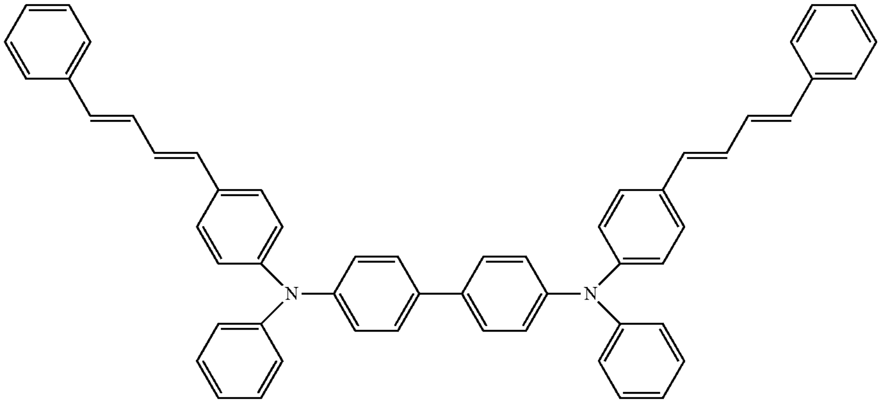

-continued
(CTM-5)
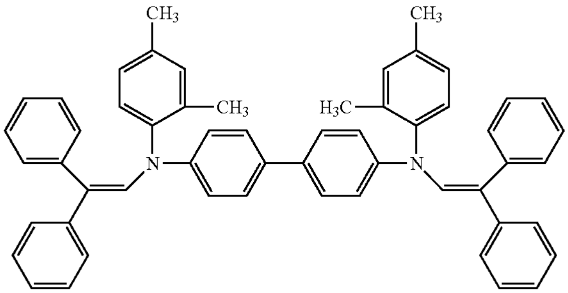
(CTM-6)
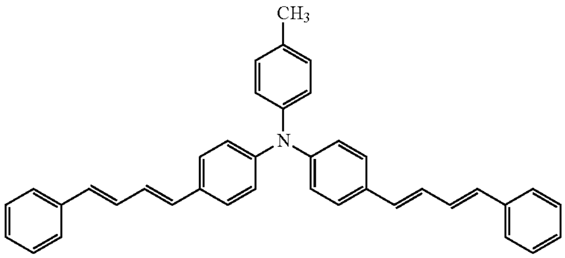
(CTM-7)
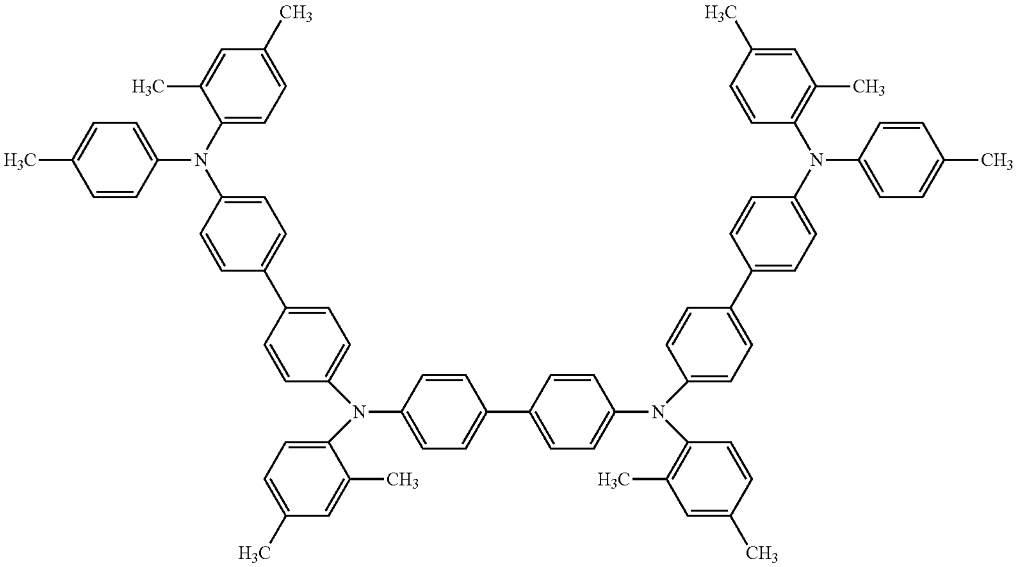
(CTM-8)
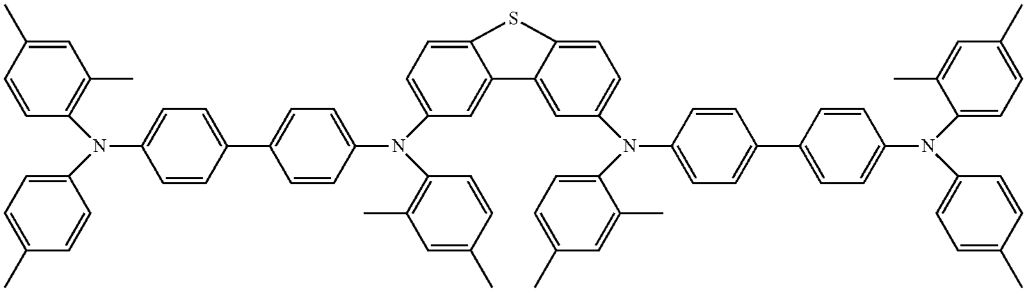
(CTM-9)
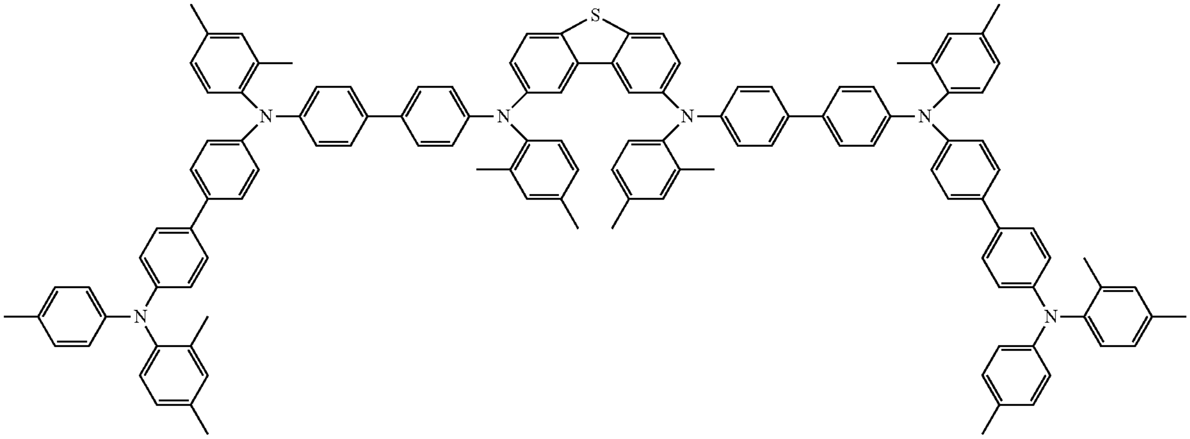

-continued
(CTM-10)
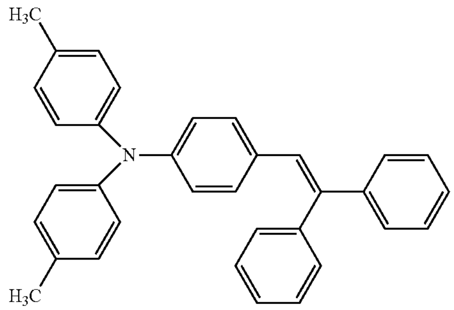
(CTM-11)
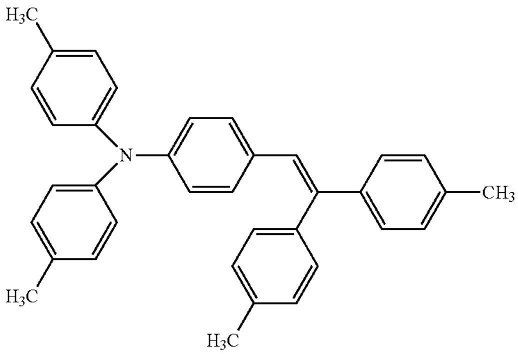
(CTM-12)
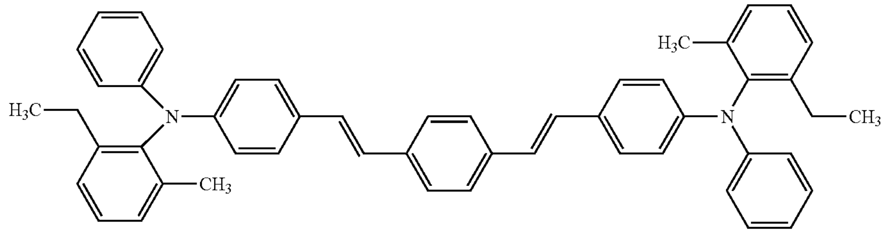
(CTM-13)
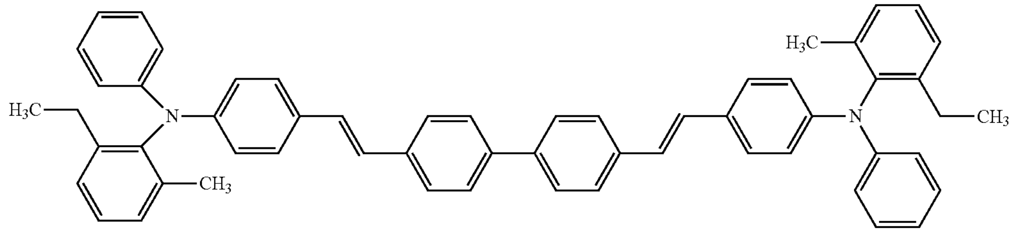
(CTM-14)
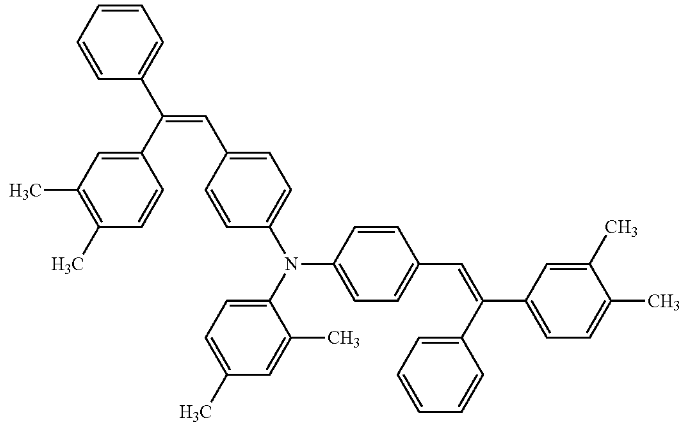
(CTM-15)
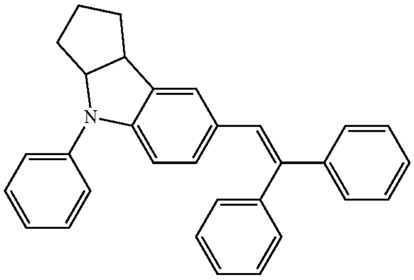
(CTM-16)
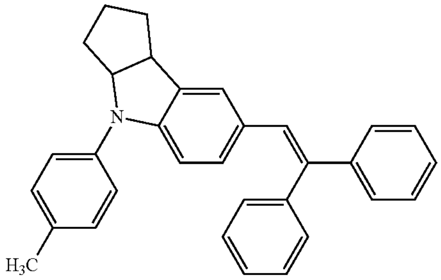

-continued (CTM-17)

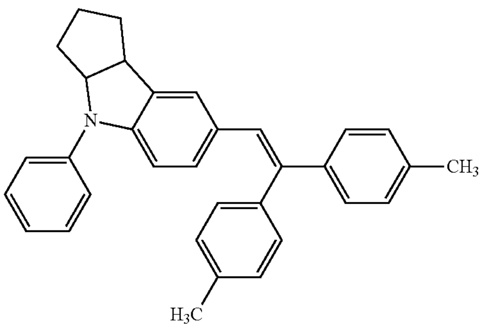

(CTM-18)

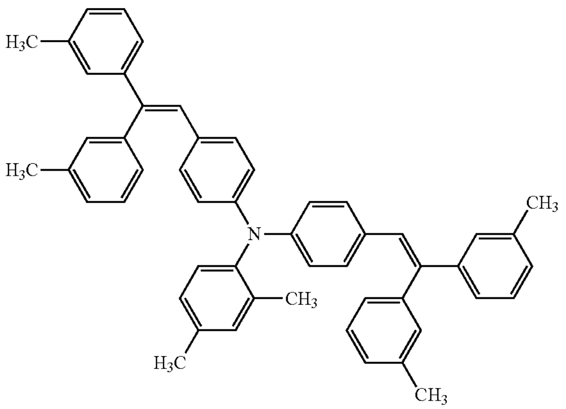

(CTM-19)

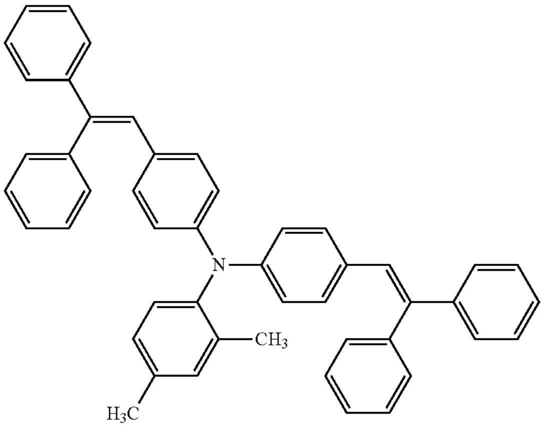

Examples of the resin include a polyester resin, a polycarbonate resin, an acrylic resin and a polystyrene resin. Among these resins, a polycarbonate resin and a polyester resin are preferable. As the polyester resin, a polyarylate resin is particularly preferable.

The content ratio (mass ratio) between the charge transporting substance and the resin is preferably 4:10 to 20:10, and more preferably 5:10 to 12:10.

The content of the charge transporting substance in the surface layer is preferably 25% by mass or more and 70% by mass or less with respect to the total mass of the surface layer and more preferably 30% by mass or more and 55% by mass or less with respect to the total mass of the surface layer.

The surface layer can be formed by dissolving the charge transporting substance, the polycarbonate resin (α), the polycarbonate resin (β), a binder resin, etc. in a solvent to prepare a coating liquid for the surface layer, forming a coating film of the coating liquid on the charge generating layer, and drying the coating film. Examples of the solvent used for the coating liquid for forming the surface layer include an alcohol-based solvent, a ketone-based solvent, an ether-based solvent, an ester-based solvent, and an aromatic hydrocarbon solvent. These solvents may be used alone or in combination of two or more. Among these solvents, from a viewpoint of resin solubility, an ether solvent or an aromatic hydrocarbon solvent is preferably used.

Process Cartridge and Electrophotographic Apparatus

The process cartridge according to the present disclosure is characterized by integrally supporting the above-described electrophotographic photosensitive member and at least one unit selected from the group consisting of a charging unit, a developing unit, a transfer unit, and a cleaning unit, and being detachably attachable to a main body of an electrophotographic apparatus.

That is, the process cartridge according to the present disclosure is a process cartridge which is detachably attachable to a main body of an electrophotographic apparatus, and which includes a cylindrical electrophotographic photosensitive member, a charging unit that charges the electrophotographic photosensitive member, and a developing unit that forms a toner image by developing toner on the electrophotographic photosensitive member, characterized in that:

the developing unit collects residual toner remaining on the electrophotographic photosensitive member after the toner image is transferred onto a transfer material, and the electrophotographic photosensitive member is the electrophotographic photosensitive member that is described above, the electrophotographic photosensitive member has a surface layer, the surface layer contains a polycarbonate resin (α) and a polycarbonate resin (β), and the polycarbonate resin (α) has a structural unit represented by the following formula (A) and a structural unit represented by the following formula (B), and the polycarbonate resin (β) is characterized by having a structure having a dimethylsiloxane moiety.

The electrophotographic apparatus according to the present disclosure is an electrophotographic apparatus which includes the above-described electrophotographic photosensitive member, charging unit, exposure unit, developing unit and transfer unit, characterized in that the electrophotographic photosensitive member is the electrophotographic photosensitive member that is described above, and the developing unit collects residual toner remaining on the electrophotographic photosensitive member after a toner image is transferred from the electrophotographic photosensitive member onto a transfer material.

FIGURE illustrates an example of a schematic configuration of an electrophotographic apparatus having a process cartridge which includes an electrophotographic photosensitive member.

A cylindrical electrophotographic photosensitive member 1 is rotationally driven around a shaft 2 in the direction of the arrow at a predetermined peripheral speed. The surface of the electrophotographic photosensitive member 1 is charged to a predetermined positive or negative potential by a charging unit 3. In FIGURE a roller charging method using a roller-type charging member is illustrated, but other charging methods such as a corona charging method, a proximity charging method and an injection charging method may be used. The surface of the charged electrophotographic photosensitive member 1 is irradiated with exposure light 4 from an exposure unit (not illustrated) to form an electrostatic latent image corresponding to target image information. The electrostatic latent image formed on the surface of the electrophotographic photosensitive member 1 is developed by a toner contained in a developing unit 5, whereby a toner image is formed on the surface of the electrophotographic photosensitive member 1. The toner image formed onto the surface of the electrophotographic photosensitive member 1 is transferred onto a transfer material 7 by a transfer unit 6. The transfer material 7 onto which the toner image has been transferred is conveyed to a fixing unit 8, the toner image is subjected to a fixing process, and is printed out from the electrophotographic apparatus. The electrophotographic apparatus may include a cleaning unit 9 for removing deposits such as toner that remain on the surface of the electrophotographic photosensitive member 1 after transfer. Further, a so-called cleaner-less system may be used in which the deposits are removed by the developing unit, for example, without providing a separate cleaning unit. The electrophotographic apparatus may have a static electricity removal mechanism that removes static electricity from the surface of the electrophotographic photosensitive member 1 using pre-exposure light 10 from a pre-exposure unit (not illustrated). In addition, a guide unit 12 such as a rail may be provided in order to attach and detach the process cartridge 11 according to the present disclosure to and from the main body of the electrophotographic apparatus.

The electrophotographic photosensitive member according to the present disclosure can be used in laser beam printers, LED printers, copying machines and the like.

EXAMPLES

The present disclosure will now be described in more detail below with reference to the following examples and comparative examples. However, the present disclosure is by no means limited by the following examples, as long as the subject matter of the present disclosure is not exceeded. In the following description of the examples, "parts" means parts by mass unless otherwise specified.

Examples 1 to 26

<Production Example of Coating Liquid for Undercoat Layer>

10 parts of polyamide resin CM-8000 (manufactured by Toray Industries, Ltd.), 30 parts of titanium oxide SMT-500 SAS (manufactured by Tayca Corporation), and 100 parts by mass of methanol were mixed, and the mixture was placed in a vertical sand mill using glass beads having a diameter of 1.0 mm. A dispersion treatment was carried out for 5 hours at a rotation speed of 800 rpm and a cooling water temperature set to 18° C. to obtain a dispersion liquid. The glass beads were removed from the dispersion using a mesh (opening: 150 μm), and the dispersion was filtered through a 4.5 μm filter to prepare a coating liquid for the undercoat layer.

<Production Example of Coating Liquid for Charge Generating Layer>

12 parts of a charge generating substance (an oxytitanium phthalocyanine pigment having a maximum peak at a Bragg angle 2θ of 27.2 degrees in X-ray diffraction), 24 parts of a polyvinyl butyral resin (S-LEC BL-1), and 300 parts of t-butyl acetate were mixed and dispersed by a sand grinder to prepare a coating liquid for the charge generating layer.

<Specific Examples of Polycarbonate Resin (α)>

Table 1 shows specific examples of the polycarbonate resin (α) represented by the structural unit represented by formula (A), the structural unit represented by formula (B), and the structural unit represented by formula (C). In Table 1, resin 1 represents the structural unit represented by formula (A), resin 2 represents the structural unit represented by formula (B), and resin 3 represents the structural unit represented by formula (C). The polycarbonate resins were synthesized by a known method.

TABLE 1

| | Resin 1 | | Resin 2 | | Resin 3 | |
|---|---|---|---|---|---|---|
| Specific example of polycarbonate resin (α) | Structural unit | Molar ratio (%) in polycarbonate resin (α) | Structural unit | Molar ratio (%) in polycarbonate resin (α) | Structural unit | Molar ratio (%) in polycarbonate resin (α) |
| PC-α-01 | A | 25 | B | 25 | C-1 | 50 |
| PC-α-02 | A | 20 | B | 30 | C-1 | 50 |
| PC-α-03 | A | 30 | B | 20 | C-1 | 50 |
| PC-α-04 | A | 15 | B | 35 | C-1 | 50 |
| PC-α-05 | A | 35 | B | 15 | C-1 | 50 |
| PC-α-06 | A | 32 | B | 32 | C-1 | 36 |
| PC-α-07 | A | 30 | B | 30 | C-1 | 40 |
| PC-α-08 | A | 20 | B | 20 | C-1 | 60 |
| PC-α-09 | A | 18 | B | 18 | C-1 | 64 |
| PC-α-10 | A | 25 | B | 25 | C-2 | 50 |
| PC-α-11 | A | 25 | B | 25 | C-5 | 50 |
| PC-α-12 | A | 25 | B | 25 | C-7 | 50 |

<Specific examples of Polycarbonate Resin (β)>

Table 2 shows specific examples of the polycarbonate resins (β) having a dimethylsiloxane moiety. In Table 2, resin 1 is the structural unit of the polycarbonate, and resin 2 is the structural unit represented by the formula (PC-B). The polycarbonate resins were synthesized by a known method.

TABLE 2

| | Resin 1 | | Resin 2 | |
|---|---|---|---|---|
| Specific example of polycarbonate resin (β) | Structural unit | Parts by mass in polycarbonate resin (β) | Structural unit having dimethylsiloxane moiety | Parts by mass in polycarbonate resin (β) |
| PC-β-01 | C-1 | 90 | D-1 | 10 |
| PC-β-02 | C-1 | 98 | D-2 | 2 |
| PC-β-03 | C-1 | 97 | D-3 | 3 |
| PC-β-04 | C-1 | 80 | D-4 | 20 |
| PC-β-05 | C-1 | 78 | E-1 | 22 |
| PC-β-06 | C-1 | 98 | E-1 | 2 |
| PC-β-07 | C-1 | 97 | E-1 | 3 |
| PC-β-08 | C-1 | 90 | E-1 | 10 |
| PC-β-09 | C-1 | 80 | E-1 | 20 |
| PC-β-10 | C-1 | 78 | E-1 | 22 |
| PC-β-11 | C-2 | 90 | D-1 | 10 |
| PC-β-12 | C-5 | 90 | D-1 | 10 |

<Production Example of Coating Liquid for Surface Layer>

(Production Example of Coating Liquid (1) for Surface Layer)

10 parts of the amine compound (charge transporting substance) represented by the above CTM-10, 10 parts of the structural unit of the polycarbonate resin (α) represented by the above PC-a-01, and 1 part of the structural unit of the polycarbonate resin (β) represented by PC-B-1 were dissolved in a mixed solvent of 30 parts of tetrahydrofuran and 70 parts of toluene to prepare a coating liquid (1) for the surface layer.

(Production Examples of Coating Liquids (2) to (26) for Surface Layer)

The coating liquids (2) to (26) for the surface layer were prepared in the same manner as the production example of the coating liquid (1) for the surface layer, except that the changes shown in the following Table 3 were made. Table 3 shows the coating liquids which is prepared.

TABLE 3

| Specific example of coating | Polycarbonate resin (α) | | Polycarbonate resin (β) | | Charge transport layer | |
|---|---|---|---|---|---|---|
| liquid for surface layer | Structure | Parts | Structure | Parts | Structure | Parts |
| Coating liquid (1) for surface layer | PC-α-01 | 10 | PC-β-01 | 1 | CTM-10 | 10 |
| Coating liquid (2) for surface layer | PC-α-02 | 10 | PC-β-01 | 1 | CTM-10 | 10 |
| Coating liquid (3) for surface layer | PC-α-03 | 10 | PC-β-01 | 1 | CTM-10 | 10 |
| Coating liquid (4) for surface layer | PC-α-04 | 10 | PC-β-11 | 1 | CTM-10 | 10 |
| Coating liquid (5) for surface layer | PC-α-05 | 10 | PC-β-12 | 1 | CTM-10 | 10 |
| Coating liquid (6) for surface layer | PC-α-06 | 10 | PC-β-01 | 1 | CTM-10 | 10 |
| Coating liquid (7) for surface layer | PC-α-07 | 10 | PC-β-01 | 1 | CTM-10 | 10 |
| Coating liquid (8) for surface layer | PC-α-08 | 10 | PC-β-01 | 1 | CTM-10 | 10 |
| Coating liquid (9) for surface layer | PC-α-09 | 10 | PC-β-01 | 1 | CTM-10 | 10 |
| Coating liquid (10) for surface layer | PC-α-01 | 10 | PC-β-02 | 1 | CTM-10 | 10 |
| Coating liquid (11) for surface layer | PC-α-01 | 10 | PC-β-03 | 1 | CTM-10 | 10 |
| Coating liquid (12) for surface layer | PC-α-01 | 10 | PC-β-04 | 1 | CTM-10 | 10 |
| Coating liquid (13) for surface layer | PC-α-01 | 10 | PC-β-05 | 1 | CTM-10 | 10 |
| Coating liquid (14) for surface layer | PC-α-01 | 10 | PC-β-06 | 1 | CTM-10 | 10 |
| Coating liquid (15) for surface layer | PC-α-01 | 10 | PC-β-07 | 1 | CTM-10 | 10 |
| Coating liquid (16) for surface layer | PC-α-01 | 10 | PC-β-08 | 1 | CTM-10 | 10 |
| Coating liquid (17) for surface layer | PC-α-01 | 10 | PC-β-09 | 1 | CTM-10 | 10 |
| Coating liquid (18) for surface layer | PC-α-01 | 10 | PC-β-10 | 1 | CTM-10 | 10 |
| Coating liquid (19) for surface layer | PC-α-01 | 10 | PC-β-10 | 1 | CTM-3 | 10 |

TABLE 3-continued

| Specific example of coating liquid for surface layer | Polycarbonate resin (α) Structure | Parts | Polycarbonate resin (β) Structure | Parts | Charge transport layer Structure | Parts |
|---|---|---|---|---|---|---|
| Coating liquid (20) for surface layer | PC-α-10 | 10 | PC-β-10 | 1 | CTM-3 | 10 |
| Coating liquid (21) for surface layer | PC-α-11 | 10 | PC-β-01 | 1 | CTM-10 | 10 |
| Coating liquid (22) for surface layer | PC-α-12 | 10 | PC-β-01 | 1 | CTM-10 | 10 |
| Coating liquid (23) for surface layer | PC-α-01 | 10 | PC-β-01 | 0.3 | CTM-10 | 10 |
| Coating liquid (24) for surface layer | PC-α-01 | 10 | PC-β-01 | 0.5 | CTM-10 | 10 |
| Coating liquid (25) for surface layer | PC-α-01 | 10 | PC-β-01 | 1.5 | CTM-10 | 10 |
| Coating liquid (26) for surface layer | PC-α-01 | 10 | PC-β-01 | 1.7 | CTM-10 | 10 |

<Production Example of Electrophotographic Photosensitive Members>

(Production Example of Electrophotographic Photosensitive Member (1))

An aluminum cylinder (JIS H 4000: 2006 A3003P, aluminum alloy) having a diameter of 20 mm and a length of 254.8 mm was cut (JIS B 0601: 2014, ten-point average roughness Rzjis: 0.8 μm) for use as a support.

An undercoat layer having a film thickness of 4.2 μm was formed by dip-coating the coating liquid for the undercoat layer onto the support and drying the resulting coating film at 150° C. for 20 minutes.

Next, a charge generating layer having a film thickness of 0.3 μm was formed by dip-coating the coating liquid for the charge generating layer onto the undercoat layer and drying the resulting coating film at 140° C. for 10 minutes.

Next, a surface layer having a film thickness of 23.0 μm was formed by dip-coating the coating liquid (1) for the surface layer onto the charge generating layer and drying the resulting coating film at 125° C. for 30 minutes. The film thickness of the surface layer can be measured, for example, by SEM observation of a cross section.

(Production Examples of Electrophotographic Photosensitive Members (2) to (26))

Electrophotographic photosensitive members (2) to (26) in the combinations shown in Table 4 were produced in the same manner as in the production example of the electrophotographic photosensitive member (1), except that the coating liquid for the surface layer was changed, and the viscosity of the coating liquid for the surface layer, or the coating speed during the dip coating, or both the viscosity and the coating speed during the dip coating, were changed so as to achieve the film thicknesses shown in Table 4.

TABLE 4

| Production example of electrophotographic photosensitive member | Surface layer: Coating liquid for surface layer | Surface layer: Film thickness (μm) |
|---|---|---|
| Electrophotographic photosensitive member (1) | Coating liquid (1) for surface layer | 23.0 |
| Electrophotographic photosensitive member (2) | Coating liquid (2) for surface layer | 23.0 |
| Electrophotographic photosensitive member (3) | Coating liquid (3) for surface layer | 23.0 |
| Electrophotographic photosensitive member (4) | Coating liquid (4) for surface layer | 18.0 |

TABLE 4-continued

| Production example of electrophotographic photosensitive member | Surface layer: Coating liquid for surface layer | Surface layer: Film thickness (μm) |
|---|---|---|
| Electrophotographic photosensitive member (5) | Coating liquid (5) for surface layer | 14.0 |
| Electrophotographic photosensitive member (6) | Coating liquid (6) for surface layer | 23.0 |
| Electrophotographic photosensitive member (7) | Coating liquid (7) for surface layer | 23.0 |
| Electrophotographic photosensitive member (8) | Coating liquid (8) for surface layer | 10.1 |
| Electrophotographic photosensitive member (9) | Coating liquid (9) for surface layer | 23.0 |
| Electrophotographic photosensitive member (10) | Coating liquid (10) for surface layer | 23.0 |
| Electrophotographic photosensitive member (11) | Coating liquid (11) for surface layer | 23.0 |
| Electrophotographic photosensitive member (12) | Coating liquid (12) for surface layer | 23.0 |
| Electrophotographic photosensitive member (13) | Coating liquid (13) for surface layer | 23.0 |
| Electrophotographic photosensitive member (14) | Coating liquid (14) for surface layer | 23.0 |
| Electrophotographic photosensitive member (15) | Coating liquid (15) for surface layer | 23.0 |
| Electrophotographic photosensitive member (16) | Coating liquid (16) for surface layer | 23.0 |
| Electrophotographic photosensitive member (17) | Coating liquid (17) for surface layer | 23.0 |
| Electrophotographic photosensitive member (18) | Coating liquid (18) for surface layer | 23.0 |
| Electrophotographic photosensitive member (19) | Coating liquid (19) for surface layer | 23.0 |
| Electrophotographic photosensitive member (20) | Coating liquid (20) for surface layer | 23.0 |
| Electrophotographic photosensitive member (21) | Coating liquid (21) for surface layer | 23.0 |
| Electrophotographic photosensitive member (22) | Coating liquid (22) for surface layer | 23.0 |
| Electrophotographic photosensitive member (23) | Coating liquid (23) for surface layer | 23.0 |
| Electrophotographic photosensitive member (24) | Coating liquid (24) for surface layer | 23.0 |
| Electrophotographic photosensitive member (25) | Coating liquid (25) for surface layer | 23.0 |
| Electrophotographic photosensitive member (26) | Coating liquid (26) for surface layer | 23.0 |

[Evaluation Method of Crack Test during Low-Temperature Transportation]

The degree of an occurrence of a crack of the surface layer of the electrophotographic photosensitive member during low-temperature transportation was alternatively evaluated by the following evaluation method.

An evaluation was performed by replacing an electrophotographic photosensitive member from the cartridge of a LaserJet Pro M-452dw (manufactured by Hewlett-Packard Company). For the evaluation, any mounted cartridge may be used.

After the cartridge was removed, an electrophotographic photosensitive member mounted of the product was removed, the various electrophotographic photosensitive members produced according to the present disclosure were attached, and the cartridge was reassembled. The reassembled cartridge was allowed to stand in an environment of 0° C./15% RH for 30 days, and then allowed to stand still in an environment of 23° C./50% RH for one day.

After that, the electrophotographic photosensitive member was again removed from the cartridge, and the surface of the electrophotographic photosensitive member was observed using a laser microscope (for example, VK-X3000 manufactured by Keyence Corporation) to observe an occurrence of a crack on the surface. After that, the electrophotographic photosensitive member was again attached to the cartridge, attached to the LaserJet Pro M-452dw, a halftone image was output under an environment of 23° ° C./50% RH, and the output image was evaluated.

The occurrence of a crack on the surface layer and the output image were evaluated using the following evaluation ranks.

Rank A: Observation with the laser microscope showed no crack on the surface of the electrophotographic photosensitive member, and there was no impact on the image.

Rank B: Observation with the laser microscope showed slight cracks on the surface of the electrophotographic photosensitive member, but there was no impact on the image.

Rank C: Observation with the laser microscope showed cracks on the surface of the electrophotographic photosensitive member, but there was no impact in terms of practical use of the image.

Rank D: Observation with the laser microscope showed cracks on the surface of the electrophotographic photosensitive member, and there was an impact in terms of practical use of the image.

The evaluation results are shown in Table 5.

TABLE 5

| Production example of electrophotographic photosensitive member | Low-temperature cracking test |
|---|---|
| Electrophotographic photosensitive member (1) | A |
| Electrophotographic photosensitive member (2) | A |
| Electrophotographic photosensitive member (3) | A |
| Electrophotographic photosensitive member (4) | C |

TABLE 5-continued

| Production example of electrophotographic photosensitive member | Low-temperature cracking test |
|---|---|
| Electrophotographic photosensitive member (5) | C |
| Electrophotographic photosensitive member (6) | B |
| Electrophotographic photosensitive member (7) | A |
| Electrophotographic photosensitive member (8) | A |
| Electrophotographic photosensitive member (9) | B |
| Electrophotographic photosensitive member (10) | B |
| Electrophotographic photosensitive member (11) | A |
| Electrophotographic photosensitive member (12) | A |
| Electrophotographic photosensitive member (13) | B |
| Electrophotographic photosensitive member (14) | B |
| Electrophotographic photosensitive member (15) | A |
| Electrophotographic photosensitive member (16) | A |
| Electrophotographic photosensitive member (17) | A |
| Electrophotographic photosensitive member (18) | B |
| Electrophotographic photosensitive member (19) | B |
| Electrophotographic photosensitive member (20) | C |
| Electrophotographic photosensitive member (21) | B |
| Electrophotographic photosensitive member (22) | B |
| Electrophotographic photosensitive member (23) | B |
| Electrophotographic photosensitive member (24) | A |
| Electrophotographic photosensitive member (25) | A |
| Electrophotographic photosensitive member (26) | B |

Comparative Examples 1 to 3

<Specific Examples of Polycarbonate Resin (α) for Comparative Examples>

Table 6 shows specific examples of the polycarbonate resin (α) for the comparative examples represented by the structural unit represented by formula (A), the structural unit represented by formula (B), and the structural unit represented by formula (C-1). In Table 6, resin 1 represents the structural unit represented by formula (A), resin 2 represents the structural unit represented by formula (B), and resin 3 represents the structural unit represented by formula (C). The polycarbonate resins (α) for the comparative examples were synthesized by a known method.

TABLE 6

| Specific example of polycarbonate | Resin 1 | | Resin 2 | | Resin 3 | |
|---|---|---|---|---|---|---|
| resin (α) for comparative examples | Structural unit | Molar ratio (%) in polycarbonate resin (α) | Structural unit | Molar ratio (%) in polycarbonate resin (α) | Structural unit | Molar ratio (%) in polycarbonate resin (α) |
| PC-α-13 | A | 50 | B | 0 | C-1 | 50 |

<Specific examples of Polycarbonate Resin (B) for Comparative Examples>

Table 7 shows specific examples of the polycarbonate resins (β) for the comparative examples having a dimethylsiloxane moiety. In Table 7, resin 1 is the structural unit of the polycarbonate, and resin 2 is the structural unit represented by the formula (PC-B). The polycarbonate resins (β) for the comparative examples were synthesized by a known method.

TABLE 7

| Specific example of polycarbonate resin (β) for comparative examples | Resin 1 | | Resin 2 | |
|---|---|---|---|---|
| | Structural unit | Parts by mass in polycarbonate resin (β) | Structural unit having dimethylsiloxane moiety | Parts by mass in polycarbonate resin (β) |
| PC-β-13 | C-1 | 100 | D | 0 |

<Production Examples of Coating Liquids for Surface Layer for Comparative Examples>

The coating liquids (1) to (3) for the surface layer for the comparative examples were prepared in the same manner as the production example of the coating liquid (1) for the surface layer, except that the changes shown in the following Table 8 were made. Table 8 shows the coating liquids which is prepared.

TABLE 8

| Specific example of coating liquid for surface layer for comparative examples | Polycarbonate resin (α) | | Polycarbonate resin (β) | | Charge transporting layer | |
|---|---|---|---|---|---|---|
| | Structure | Parts | Structure | Parts | Structure | Parts |
| Coating liquid (1) for surface layer for comparative example | PC-α-13 | 11 | — | — | CTM-10 | 10 |
| Coating liquid (2) for surface layer for comparative example | PC-α-13 | 10 | PC-β-13 | 1 | CTM-10 | 10 |
| Coating liquid (3) for surface layer for comparative example | PC-α-01 | 11 | — | — | CTM-10 | 10 |

<Production Examples of Electrophotographic Photosensitive Members for Comparative Examples>

Electrophotographic photosensitive members (1) to (3) for the comparative examples in the combinations shown in Table 9 were produced in the same manner as in the production example of the electrophotographic photosensitive member (1), except that the coating liquid for the surface layer was changed to the coating liquid for the surface layer for the comparative examples, and the viscosity of the coating liquid for the surface layer for the comparative examples, or the coating speed during the dip coating, or both the viscosity and the coating speed during the dip coating, were changed so as to achieve the desired film thickness in the production example of the electrophotographic photosensitive member (1).

TABLE 9

| Production example of electrophotographic photosensitive member | Surface layer | |
|---|---|---|
| | Coating liquid for surface layer for comparative example | Film thickness (μm) |
| Electrophotographic photosensitive member (1) for comparative example | Coating liquid (1) for surface layer for comparative example | 23.5 |
| Electrophotographic photosensitive member (2) for comparative example | Coating liquid (2) for surface layer for comparative example | 23.4 |
| Electrophotographic photosensitive member (3) for comparative example | Coating liquid (3) for surface layer for comparative example | 23.5 |

The electrophotographic photosensitive member for the comparative examples was also subjected to a crack test at a low temperature in the same manner as the electrophotographic photosensitive member. The results are shown in Table 10. All of the electrophotographic photosensitive members for the comparative examples were evaluated as rank D, with occurring cracks on the surface of the electrophotographic photosensitive member and the obtained image having a problem in terms of practical use.

TABLE 10

| Production example of electrophotographic photosensitive member for comparative examples | Low-temperature cracking test |
|---|---|
| Electrophotographic photosensitive member (1) for comparative example | D |
| Electrophotographic photosensitive member (2) for comparative example | D |
| Electrophotographic photosensitive member (3) for comparative example | D |

According to the present disclosure, an electrophotographic photosensitive member can be provided that enables the occurrence of a crack in the surface layer of the electrophotographic photosensitive member that occur during transportation at a low temperature to be suppressed, and that enables to obtain a good image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188610, filed Nov. 25, 2022, and Japanese Patent Application No. 2023-192367, filed Nov. 10, 2023, which are hereby incorporated by reference herein in their entirety.

What is claimed is:

1. An electrophotographic photosensitive member comprising a surface layer, wherein the surface layer comprises a polycarbonate resin (α) and a polycarbonate resin (β), wherein the polycarbonate resin (α) has a structural unit represented by a following formula (A) and a structural unit represented by a following formula (B), and wherein the polycarbonate resin (β) has a structure having a dimethylsiloxane moiety.

(A)

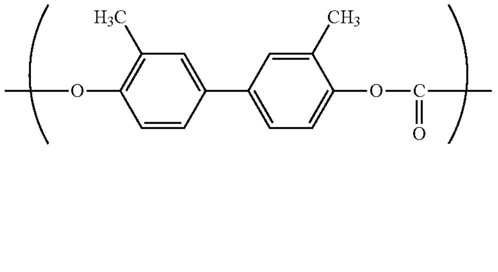

-continued (B)

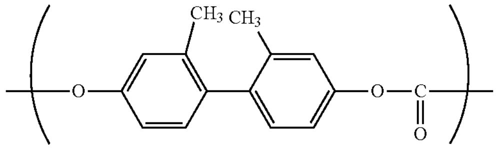

2. The electrophotographic photosensitive member according to claim 1, wherein the polycarbonate resin (α) further has a structural unit represented by the following formula (C), (C)

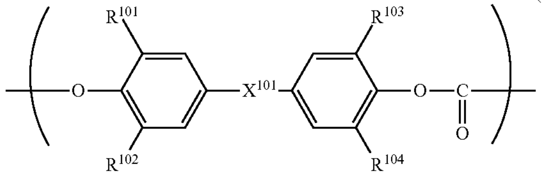

wherein $X^{101}$ represents a single bond or a divalent group, and $R^{101}$ to $R^{104}$ each independently represents a hydrogen atom, an alkyl group, or an aryl group.

3. The electrophotographic photosensitive member according to claim 2, wherein a total amount of the structural unit represented by the formula (A) and the structural unit represented by the formula (B) in the polycarbonate resin (α) is 40 mol % or more and 60 mol % or less with respect to a total amount of the structural unit represented by the formula (A), the structural unit represented by the formula (B) and the structural unit represented by the formula (C), and wherein an amount of the structural unit represented by the formula (C) in the polycarbonate resin (α) is 40 mol % or more and 60 mol % or less with respect to a total amount of the structural unit represented by the formula (A), the structural unit represented by the formula (B) and the structural unit represented by the formula (C).

4. The electrophotographic photosensitive member according to claim 1, wherein a structure having a dimethylsiloxane moiety is a structure represented by the following formula (D) or (E), (D)

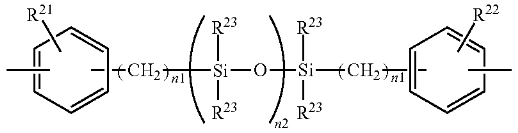

wherein $R^{21}$ and $R^{22}$ are each independently a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms, $R^{23}$ is a methyl group, n1 is an integer of 2 to 4 and n2 is an integer of 1 to 60, and (E)

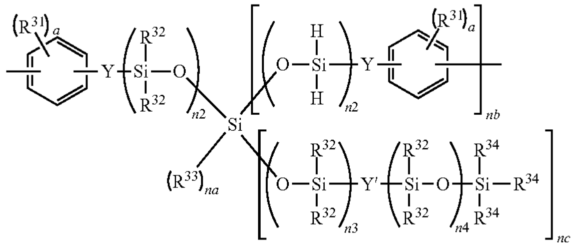

wherein $R^{31}$ represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 carbon atoms, $R^{32}$ is a methyl group, $R^{33}$ are each independently a same or different monovalent hydrocarbon group free of aliphatic unsaturated bond, $R^{34}$ are each independently a same or different monovalent hydrocarbon group free of aliphatic unsaturated bond, Y and Y' each represents an alkylene group having 2 or more carbon atoms, an alkyleneoxyalkylene group or an oxygen atom, na is 0 or 1, nb is 1 or 2 and nc is 1 or 2, provided that a sum of na, nb and nc is 3, n1 to n4 are each an integer of 0 or more, a sum of n1, n2, n3 and n4 is an integer of 2 to 600, the sum of n3 and n4 is an integer of 1 or more and a is an integer of 0 to 4.

5. The electrophotographic photosensitive member according to claim 1, wherein a content of the structure having a dimethylsiloxane moiety in the polycarbonate resin (β) is 3% by mass or more and 20% by mass or less with respect to a total mass of the polycarbonate resin (β).

6. The electrophotographic photosensitive member according to claim 1, wherein a content of the polycarbonate resin (β) in the surface layer is 5% by mass or more and 15% by mass or less with respect to the content of the polycarbonate resin (α).

7. The electrophotographic photosensitive member according to claim 1, wherein the electrophotographic photosensitive member comprises an undercoat layer comprising a polyamide resin and a titanium oxide particle.

8. The electrophotographic photosensitive member according to claim 1, wherein the electrophotographic photosensitive member comprises a charge generating layer comprising an oxytitanium phthalocyanine having a peak at 27.2°+0.2° of a Bragg angle 2θ in a CuKα characteristic X-ray diffraction spectrum.

9. A process cartridge which integrally supports an electrophotographic photosensitive member and a developing unit and which is detachably attachable to a main body of an electrophotographic apparatus, wherein the electrophotographic photosensitive member comprises a surface layer, the surface layer comprises a polycarbonate resin (α) and a polycarbonate resin (β), the polycarbonate resin (α) has a structural unit represented by the following formula (A) and a structural unit represented by the following formula (B) and the polycarbonate resin (β) has a structure having a dimethylsiloxane moiety, and wherein the developing unit collects residual toner remaining on the electrophotographic photosensitive member after a toner image is transferred from the electrophotographic photosensitive member onto a transfer material.

(A)

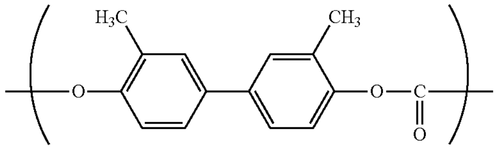

(B)

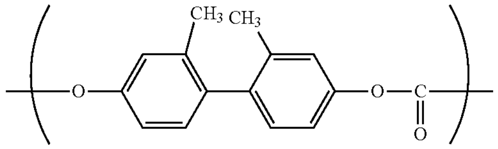

10. An electrophotographic apparatus comprising an electrophotographic photosensitive member, a charging unit, an exposure unit, a developing unit and a transfer unit, wherein the electrophotographic photosensitive member comprises a surface layer, the surface layer comprises a polycarbonate resin (α) and a polycarbonate resin (β), the polycarbonate resin (α) has a structural unit represented by the following formula (A) and a structural unit represented by the following formula (B) and the polycarbonate resin (β) has a structure having a dimethylsiloxane moiety, and wherein the developing unit collects residual toner remaining on the electrophotographic photosensitive member after a toner image is transferred from the electrophotographic photosensitive member onto a transfer material.

(A)

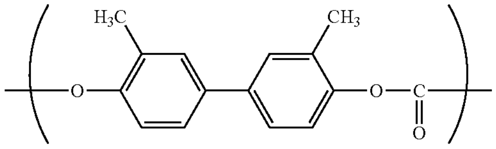

(B)

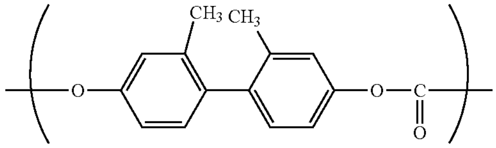

* * * * *